US010007131B2

(12) United States Patent
Bae et al.

(10) Patent No.: US 10,007,131 B2
(45) Date of Patent: Jun. 26, 2018

(54) DISPLAY DEVICE AND METHOD FOR REPAIRING DISPLAY DEVICE

(71) Applicant: Samsung Display Co., Ltd., Yongin-si (KR)

(72) Inventors: Yang Ho Bae, Asan-si (KR); In Cheol Song, Daejeon (KR); Ji Hoon Shin, Asan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 44 days.

(21) Appl. No.: 15/048,783

(22) Filed: Feb. 19, 2016

(65) Prior Publication Data

US 2016/0349549 A1 Dec. 1, 2016

(30) Foreign Application Priority Data

May 26, 2015 (KR) ........................ 10-2015-0073075

(51) Int. Cl.

*G02F 1/13* (2006.01)
*G02F 1/1335* (2006.01)
*G02F 1/1362* (2006.01)
*G02F 1/1333* (2006.01)

(52) U.S. Cl.

CPC ...... *G02F 1/1309* (2013.01); *G02F 1/133305* (2013.01); *G02F 1/133512* (2013.01); *G02F 1/133514* (2013.01); *G02F 1/136259* (2013.01); *G02F 1/133345* (2013.01); *G02F 2001/136254* (2013.01); *G02F 2201/508* (2013.01)

(58) Field of Classification Search

CPC ...................................................... G02F 1/1309

See application file for complete search history.

(56) References Cited

U.S. PATENT DOCUMENTS

2006/0126003 A1* 6/2006 Yoo .................. G02F 1/136259 349/192
2008/0100779 A1* 5/2008 Choo .................. G02B 5/3058 349/96
2009/0141231 A1 6/2009 Lim et al.
2010/0302484 A1 12/2010 Yoo et al.
2012/0002155 A1 1/2012 Lin et al.

FOREIGN PATENT DOCUMENTS

JP 4794488 8/2011
KR 100780012 11/2007
KR 100879012 1/2009

OTHER PUBLICATIONS

European Search Report—European Application No. 16171564.4 dated Aug. 10, 2016, citing KR10-0780012 and US20090141231.

* cited by examiner

*Primary Examiner* — Edmond Lau

(74) *Attorney, Agent, or Firm* — Cantor Colburn LLP

(57) ABSTRACT

A method for repairing a display device including a defective pixel area where a failure has occurred includes irradiating a first laser beam to a first interface provided between a first layer and a second layer that contact each other corresponding to the defective pixel area to form a protrusion-depression surface in one or more surfaces of the first layer and the second layer that form the first interface; and irradiating a second laser beam to the protrusion-depression surfaces provided in one or more surfaces of the first and second layers to burn the protrusion-depression surface.

14 Claims, 15 Drawing Sheets

LA1(SUB2) LA3 IS LA2(CF) GA LA4(PI2) LA4 BM LA1 LA3 LA2 E2 E2 LC PI1 E1 PX1 E1 WI SUB1 PX2

DISPLAY DEVICE AND METHOD FOR REPAIRING DISPLAY DEVICE

This application claims priority to Korean Patent Application No. 10-2015-0073075 filed on May 26, 2015, and all the benefits accruing therefrom under 35 U.S.C. § 119, the content of which in its entirety is incorporated herein by reference.

BACKGROUND

1. Field

The exemplary embodiments relate generally to a display device and a method for repairing the display device.

2. Description of the Related Art

In general, an organic light emitting display, a liquid crystal display ("LCD"), a plasma display panel, and the like are representative examples of a flat panel display.

The LCD includes a first substrate, a liquid crystal layer, electrodes driving the liquid crystal layer, wires supplying current to the electrodes, a second substrate, and a plurality of insulation layers provided between the first substrate and the second substrate.

Such an LCD displays predetermined images by forming a plurality of pixel areas, each being the minimum unit for displaying an image, with a first substrate, a liquid crystal layer, electrodes driving the liquid crystal layer, wires supplying current to the electrodes, a second substrate, and a plurality of insulation layers provided between the first substrate and the second substrate.

SUMMARY

When an error occurs in one of the above-stated constituent elements, an error occurs in an image displayed in a defective pixel area where the error occurred among the plurality of pixel areas.

The described technology provides a display device in which a defective pixel area is repaired, and a method for easily repairing a defective pixel area of a display device.

One exemplary embodiment provides a method for repairing a display device including a defective pixel area where a failure has occurred. The method include: irradiating a first laser beam to a first interface provided between a first layer and a second layer that contact each other corresponding to the defective pixel area to form a protrusion-depression surface in one or more surfaces of the first layer and the second layer that form the first interface; and irradiating a second laser beam to the protrusion-depression surfaces provided in one or more surfaces of the first and second layers to burn the protrusion-depression surface.

In an exemplary embodiment, the method further includes flowing a black material melted from a black matrix that neighbors the first interface to the protrusion-depression surface, wherein the irradiating the second laser beam may further include burning the black material provided in the protrusion-depression surface.

In an exemplary embodiment, the irradiating the first laser beam may further include forming a protrusion-depression surface in one or more surfaces of the second layer and a third layer contacting each other and thus forming a second interface, and, the irradiating the second laser beam may further include burning the protrusion-depression surface provided in one or more surfaces of the second layer and the third layer.

In an exemplary embodiment, the method may further include flowing a black material melted from a black matrix that is disposed neighboring the second interface to the protrusion-depression surface, and the irradiating the second laser beam may further include burning the black matrix provided in the protrusion-depression surface.

In an exemplary embodiment, the irradiating the first laser beam may further include forming a protrusion-depression surface in one or more surfaces of the third layer and a fourth layer that contact each other and thus form a third interface, and the irradiating the second laser beam may further include burning the protrusion-depression surface provided in one or more surfaces of the third layer and the fourth layer.

Another exemplary embodiment provides a display device including a first pixel area where a failure has occurred and a second pixel area neighboring the first pixel area. The display device includes a first layer and a second layer contacting each other and thus forming a first interface, wherein a burned protrusion-depression surface is provided in one or more surfaces of the first layer and the second layer that form the first interface corresponding to the first pixel area.

In an exemplary embodiment, the first layer may be a substrate and the second layer may include an organic material.

In an exemplary embodiment, the second layer may be a color filter.

In an exemplary embodiment, the protrusion-depression surface may be provided in the second layer.

In an exemplary embodiment, the first layer may include an inorganic material, and the second layer comprises an organic material.

In an exemplary embodiment, the protrusion-depression surface may be provided in the second layer.

In an exemplary embodiment, the display device may further include a black matrix provided neighboring the first interface and extended to the protrusion-depression surface, wherein at least a part of the black matrix extended to the protrusion-depression surface is burned.

In an exemplary embodiment, the display device may further include a third layer contacting the second layer and thus forming a second interface, wherein a burned protrusion-depression surface may be provided in one or more surfaces of the second and third layers forming the second interface corresponding to the first pixel area.

In an exemplary embodiment, the second layer and the third layer respectively may include an organic material.

In an exemplary embodiment, the second layer is may be color filter.

In an exemplary embodiment, the protrusion-depression surface may be provided in each of the second and third layers.

In an exemplary embodiment, the second layer may include an organic material, and the third layer may include a transparent conductive oxide.

In an exemplary embodiment, the protrusion-depression surface may be provided in the second layer.

In an exemplary embodiment, the display device may further include a black matrix provided neighboring the second interface and extended to the protrusion-depression surface, wherein at least a part of the black matrix extended to the protrusion-depression surface may be burned.

In an exemplary embodiment, the display device may further include a fourth layer contacting the third layer and thus forming a third interface, wherein a burned protrusion-depression surface may be provided in one or more surfaces of the third and fourth layers forming the third interface corresponding to the first pixel area.

According to one of exemplary embodiments, a display device in which a defective pixel area is repaired and a method for repairing a defective pixel area of the display device can be provided.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
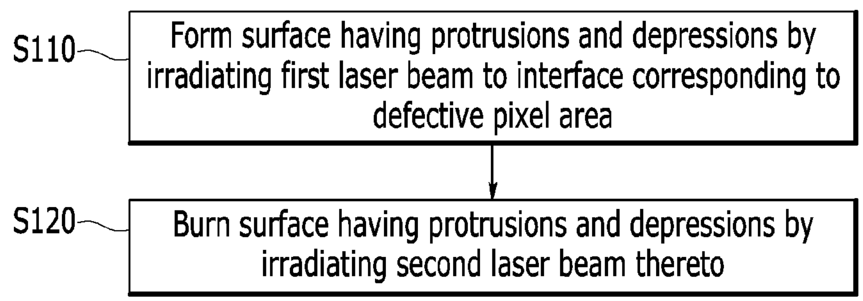
FIG. 1 illustrates a flowchart of an exemplary embodiment of a repair method of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

Accordingly, the drawings and description are to be regarded as illustrative in nature and not restrictive. Like reference numerals designate like elements throughout the specification.

Further, in exemplary embodiments, since like reference numerals designate like elements having the same configuration, a first exemplary embodiment is representatively described, and in other exemplary embodiments, only configurations that differ from the first exemplary embodiment will be described.

In addition, the size and thickness of each configuration shown in the drawings are arbitrarily shown for better understanding and ease of description, but the invention is not limited thereto.

In the drawings, the thickness of layers, films, panels, regions, etc., are exaggerated for clarity. In the drawings, for understanding and ease of description, the thickness of some layers and areas is exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the specification, the word "on" means positioning on or below the object portion, but does not essentially mean positioning on the upper side of the object portion based on a gravity direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a repair method of a display device according to an exemplary embodiment will be described with reference to FIGS. 1 to 4.

Figure 2:
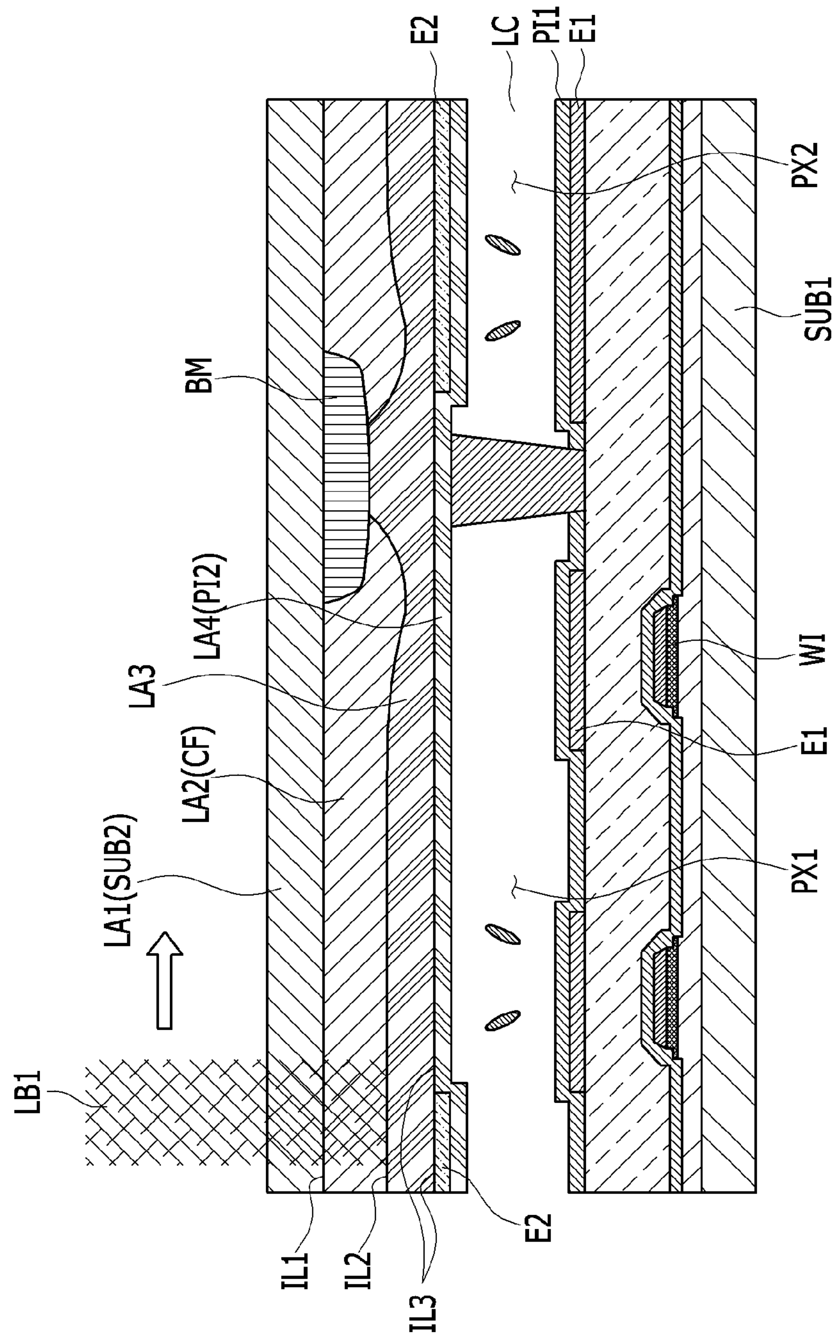
FIG. 2 to FIG. 4 illustrate cross-sectional views of the exemplary embodiment of the repair method of the display device according to the invention.
Figure 3:
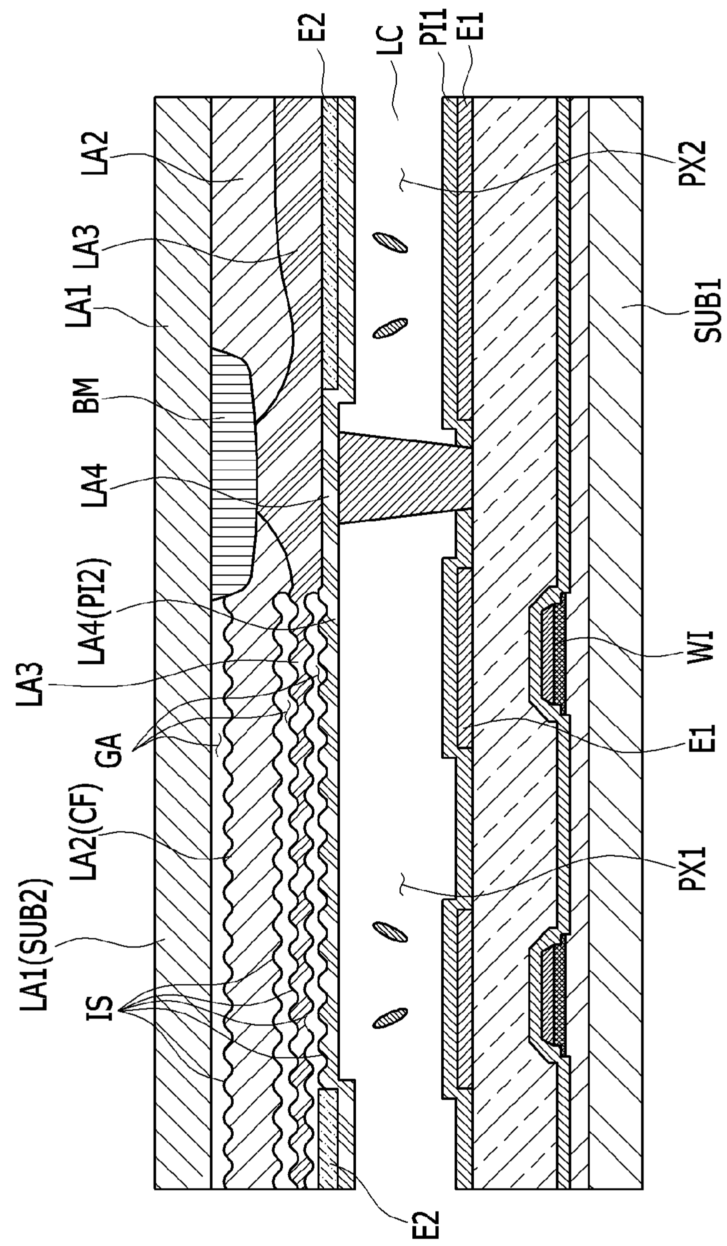
Figure 4:
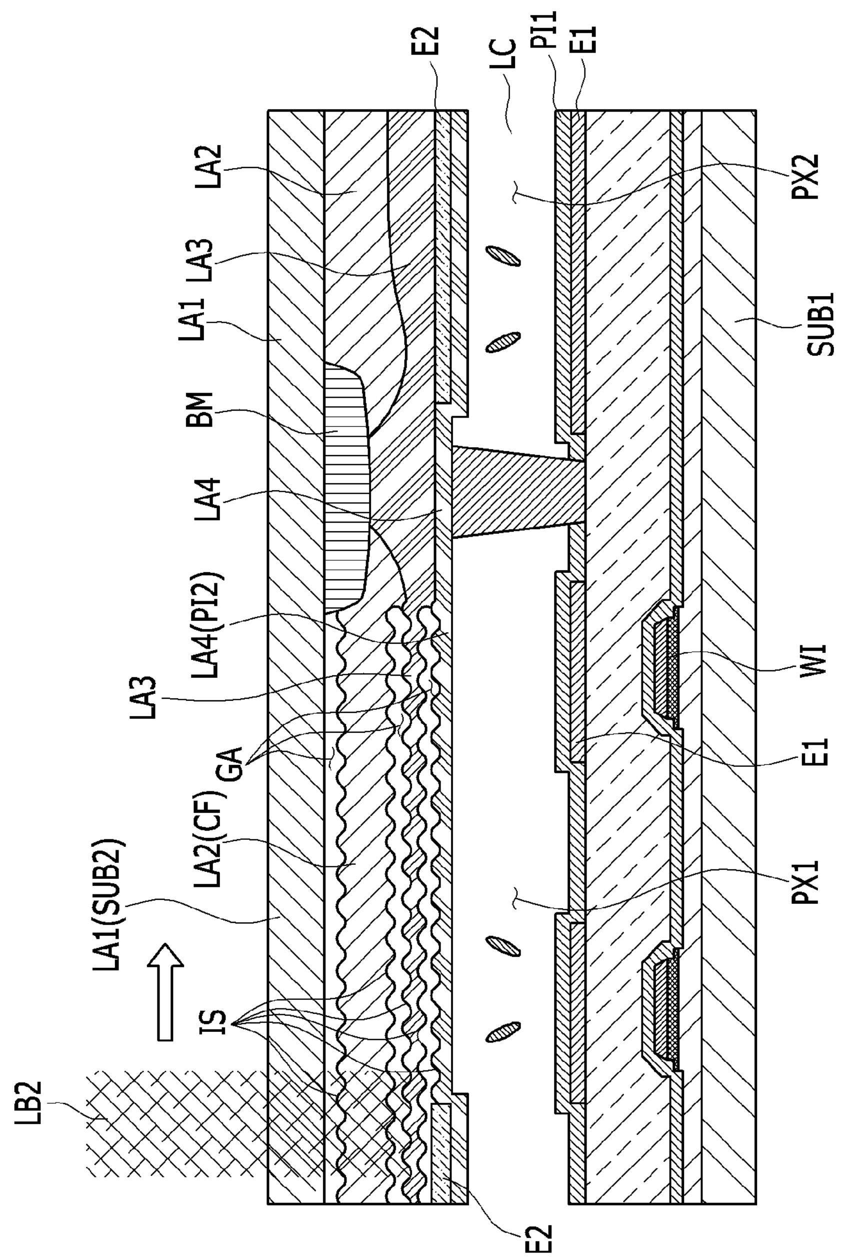

FIG. 1 illustrates a flowchart of a repair method of a display device according to an exemplary embodiment. FIGS. 2 to 4 illustrate cross-sectional views of the repair method of the display device according to the exemplary embodiment.

First, as shown in FIGS. 1 to 3, a surface having protrusion-depression is formed in an interface by irradiating a first laser beam corresponding to a defective pixel area (S110).

In detail, first, as shown in FIG. 2, the display device includes a plurality of pixel areas, each being a minimum unit for displaying an image, and the plurality of pixel areas include a first pixel area PX1 and a second pixel area PX2. The display device includes a first substrate SUB1, a wire WI, a first electrode E1, a first alignment layer PI1, a liquid crystal layer LC, a fourth layer LA1 which is a second alignment layer PI2, a second electrode E2, a third layer LA3 which is an insulation layer, a second layer LA2 which is a color filter CF, a black matrix BM, and a first layer LA1 which is a second substrate SUB2.

The first substrate SUB1, the wiring WI, the first electrode E1, the first alignment layer PI1, the liquid crystal layer LC, the fourth layer LA4 which is the second alignment layer PI2, the second electrode E2, the third layer LA3 which is the insulation layer, the second layer LA2 which is the color filter CF, the black matrix BM, and the first layer LA1 which is the second substrate SUB2 may have various structures known to a person skilled in the art, and thus the structure shown in FIG. 2 is not restrictive.

In order to determine whether an error has occurred in the plurality of pixel areas of the display device, a lighting test is performed, and when it is determined that an error has occurred in a first pixel area PX1 among the first pixel area PX1 and the second pixel area PX2 of the plurality of pixel areas, the first laser beam LB1 is irradiated to a first interface IL1 between the first layer LA1 which is the second substrate SUB2 and the second layer LA2 which is the color filter CF. Here, the first layer LA1 and the second layer LA2 contact each other corresponding to the first pixel area PX1 which is the defective pixel area. The first laser beam LB1 may scan the entire area of the first pixel area PX1 with various routes in a plane.

As shown in FIGS. 2 and 3, the first laser beam LB1 may be irradiated to one of the first interface IL1 between the first layer LA1 and the second layer LA2 that contact each other, a second interface IL2 between the second layer LA2 and the third layer LA3 that contact each other, and a third interface IL3 between the third layer LA3 and the fourth layer LA4 that contact each other, and a surface of one of layers including an organic material among the first, second, third, and fourth layers LA1, LA2, LA3, and LA4 is formed as a surface IS having protrusion-depression caused by energy from the first laser beam LB1. That is, one or more surfaces of the first layer LA1 and the second layer LA2 forming the first interface IL1 between the first layer LA1 and the second layer LA2 that contact each other is formed as the surface IS having protrusion-depression, one or more surfaces of the second layer LA2 and the third layer LA3 forming the second interface IL2 between the second layer LA2 and the third layer LA3 that contact each other is formed as the surface IS having protrusion-depression, and one or more surfaces of the third layer LA3 and the fourth layer LA4 forming the third interface IL3 between the third layer LA3 and the fourth layer LA4 that contact each other is formed as the surface IS having protrusion-depression.

In an exemplary embodiment, when the first laser beam LB1 is irradiated to the second interface IL2, the energy from the first laser beam LB1 is transferred not only to the first interface IL1 but also to the third interface IL3 that neighbors the second interface IL2 while at the same time the first laser beam LB1 passes through the first interface IL1 such that a surface of one or more layers including an organic material among the first, second, third, and fourth layers LA1, LA2, LA3, and LA4 is provided as the surface IS having protrusion-depression, for example.

In the exemplary embodiment, the first layer LA1 includes the second substrate SUB2 that may include an inorganic material, metal, and glass, the second layer LA2 includes the color filter CF including an organic material, the third layer LA3 includes an insulation layer including an organic material, and the fourth layer LA4 includes the second alignment layer PI2 including an organic material such that the surface of each of the second, third, and fourth layers LA2, LA3, and LS4 is provided as the surface IS having the protrusion-depression by the first laser beam LB1. Gaps GA are respectively defined between the first interface IL1, the second interface IL2, and the third interface IL3 where the surfaces IS having protrusion-depression are provided. Specifically, lateral surfaces of the second layer LA2 where the first interface IL1 and the second interface IL2 are provided are provided as the surfaces IS having protrusion-depression, lateral surfaces of the third layer LA3 where the second interface IL2 and the third interface IL3 are provided are provided as the surfaces IS having protrusion-depression, and one surface of the fourth layer LA4 where the third interface IL3 is provided is provided as the surface IS having protrusion-depression.

Next, as shown in FIG. 4, the surface IS having protrusion-depression is burnt by irradiating a second laser beam LB2 thereto (S120 in FIG. 1).

Specifically, the second laser beam LB2 is irradiated to one or more surfaces IS having protrusion-depression among the first layer LA1 and the second layer LA2 corresponding to the first pixel area PX1, which is a defective pixel area, so as to burn the surface IS having protrusion-depression. The surface IS having protrusion-depression may be carbonized while being burnt by irradiation of the second laser beam LB2, and accordingly, the first pixel area PX1, which is the defective pixel area, may be recognized as a dark spot.

The second laser beam LB2 may scan the entire area of the first pixel area PX1 with various routes in a plane.

The second laser beam LB2 may be irradiated to one or more surfaces IS having protrusion-depression among the first layer LA1, the second layer LA2, the third layer LA3, and the fourth layer LA4, and the protrusion-depression surface IS provided in the surface of one or more layers of the second layer LA2, the third layer LA3, and the fourth layer LA4 including an organic material may be carbonized while being burnt by energy of the second laser beam LB2. That is, the protrusion-depression surface IS provided in one or more surfaces of the first layer LA1 and the second layer LA2 is burnt by the second laser beam LB2, the protrusion-depression surface IS provided in one or more surfaces of the second layer LA2 and the third layer LA3 is burnt, and the protrusion-depression surface IS provided in one or more surfaces of the third layer LA3 and the fourth layer LA4 is burnt, and accordingly each protrusion-depression surface IS may be carbonized.

In an exemplary embodiment, when the second laser beam LB2 is irradiated to the protrusion-depression surface IS of the third layer LA3, the second laser beam LB2 passes the protrusion-depression surface IS of one or more of the first layer LA1 and the second layer LA2 and at the same time the energy from the second laser beam LB2 is transferred to the protrusion-depression surface IS of the fourth layer LA4 that neighbors the third layer LA3 such that one or more protrusion-depression surfaces IS including an organic material among the first layer LA1, the second layer LA2, the third layer LA3, and the fourth layer LA4 may be burnt and thus carbonized by the energy of the second laser beam LB2, for example. The protrusion-depression surface IS occupies much more surface area compared to a flat surface in the same space, and thus the protrusion-depression surface IS may be easily carbonized by being burnt by the energy of the second laser beam LB2.

In the exemplary embodiment, the protrusion-depression surface IS is provided in each of the second layer LA2, the third layer LA3, and the fourth layer LA4, and the respective protrusion-depression surfaces IS may be burnt and then carbonized by the energy of the second laser beam LB2. Specifically, the protrusion-depression surfaces IS provided in lateral sides of the second layer LA2, the protrusion-depression surfaces IS provided in lateral sides of the third layer LA3, and the protrusion-depression surface IS provided in one side of the fourth layer LA4 may be respectively burnt and then carbonized by the second laser beam LB2.

As described, according to the repair method of the display device of the exemplary embodiment, the surfaces of the second layer LA2, the third layer LA3, and the fourth layer LA4 among the first layer LA1, the second layer LA2, the third layer LA3, and the fourth layer LA4 that correspond to the first pixel area PX1, which is a defective pixel area, among the first pixel area PX1 and the second pixel area PX2 of the display device are respectively provided as the protrusion-depression surfaces IS, and the protrusion-depression surfaces IS are burnt to be carbonized such that the first pixel area PX1, which is the defective pixel area, is recognized as a dark spot, thereby preventing the first pixel area PX1 from being viewed. That is, according to the repair method of the display device, a defective pixel area may be repaired by irradiation of a laser beam twice.

In the illustrated exemplary embodiment, a liquid crystal display ("LCD") will be exemplarily described as a display device using the above-state repairing method, but it is not restrictive. A repairing method of a display device according to another exemplary embodiment may be used in various display devices such as an organic light emitting diode display ("OLED"), plasma displays ("PDs"), field emission displays ("FEDs"), electrophoretic displays ("EPDs"), electrowetting displays ("EWDs"), and the like as long as one or more layers among two layers contacting each other and thus forming an interface include an organic material.

Hereinafter, a display device according to another exemplary embodiment will be described with reference to FIG. 5.

A display device to be described hereinafter according to another exemplary embodiment may be a display device repaired by the above-described repair method of the display device.

Figure 5:
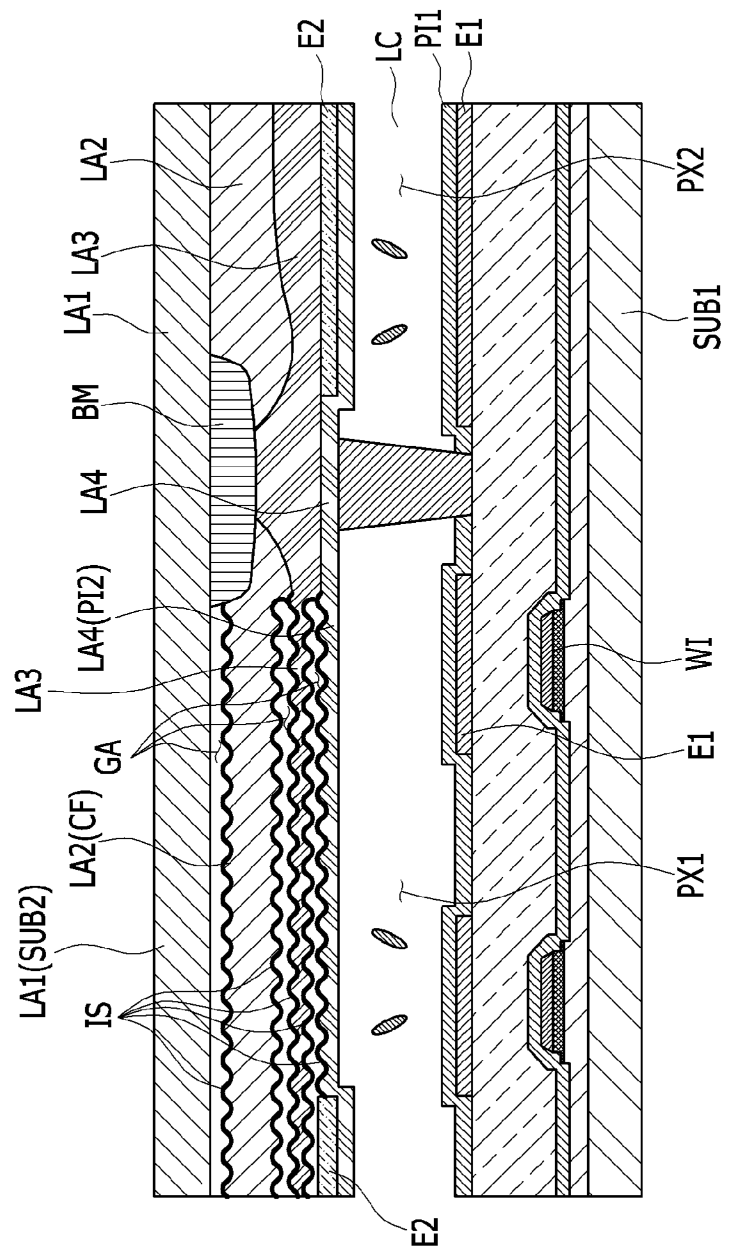
FIG. 5 illustrates a cross-sectional view of another exemplary embodiment of a display device according to the invention.

FIG. 5 illustrates a cross-sectional view of a display device according to another exemplary embodiment.

As shown in FIG. 5, a display device according to another exemplary embodiment includes a plurality of pixel areas, each being a minimum unit for displaying an image, and the plurality of pixel areas include a first pixel area PX1, which is a defective pixel area where an error has occurred, and a second pixel area PX2, which is a normal pixel area where no error has occurred. The display device includes a first substrate SUB1, a wire WI, a first electrode E1, a first alignment layer PI1, a liquid crystal layer LC, a fourth layer LA4 which is a second alignment layer PI2, a second electrode E2, a third layer LA3 which is an insulation layer, a second layer LA2 which is a color filter CF, a black matrix BM, and a first layer LA1 which is a second substrate SUB2, and they are sequentially layered.

The first substrate SUB1, the wire WI, the first electrode E1, the first alignment layer PI1, the liquid crystal layer LC, the fourth layer LA4 which is the second alignment layer PI2, the second electrode E2, the third layer LA3 which is the insulation layer, the second layer LA2 which is the color filter CF, the black matrix BM, and the first layer LA1 which is the second substrate SUB2 may have various structures known to a person skilled in the art, and thus the structure shown in FIG. 5 is not restrictive.

In the display device according to the other exemplary embodiment, one or more surfaces of the first and second layers LA1 and LA2 being in contact with each other and thus forming a first interface are provided as a burned protrusion-depression surface IS corresponding to the first pixel area PX1, one or more surfaces of the second and third layers LA2 and LA3 being in contact with each other and thus forming a second interface are provided as a burned protrusion-depression surface IS corresponding to the first pixel area PX1, and one or more surfaces of the third and fourth layers LA3 and LA4 being in contact with each other and thus forming a third interface are provided as a burned protrusion-depression surface IS corresponding to the first pixel area PX1.

In a display device according to another exemplary embodiment, the first layer LA1 is provided as a second substrate SUB2 that may include an inorganic material, a metal, glass, and the like, the second layer LA2 is provided as a color filter CF including an organic material, the third layer LA3 is provided as an insulation layer including an organic material, and the fourth layer LA4 is provided as a second alignment layer PI2 including an organic material such that a surface of each of the second, third, and fourth layers LA2, LA3, and LA4 is provided as a burned protrusion-depression surface IS. The protrusion-depression surfaces IS of the first, second, third, and fourth layers LA1, LA2, LA3, and LA4 define gaps GA between the first and second layers LA1 and LA2, between the second and third layers LA2 and LA3, and between the third and fourth layers LA3 and LA4, respectively. Specifically, lateral surfaces of the second layer LA2 respectively forming the first interface and the second interface are provided as the burned protrusion-depression surfaces IS, lateral surfaces of the third layer LA3 respectively forming the second interface and the third interface are provided as the burned protrusion-depression surfaces IS, and one surface of the fourth layer LA4 forming the third interface is provided as the burned protrusion-depression surface IS. That is, the protrusion-depression surfaces IS burned corresponding to the first pixel area PX1 are viewed as dark, and accordingly, the first pixel area PX1 is viewed as a dark spot.

As described, in the display device according to the illustrated exemplary embodiment, surfaces of the second, third, and fourth layers LA2, LA3, and LA4 among the first layer LA1, the second layer LA2, the third layer LA3, and the fourth layer LA4 that correspond to the first pixel area PX1, which is a defective pixel area where a failure has occurred among the first pixel area PX1 and the second pixel area PX2, are respectively provided as the burned protrusion-depression surfaces IS so that the first pixel area PX1, which is a defective pixel area, is viewed as a dark spot, and thus the first pixel area PX1 may be prevented from being viewed when other pixel areas among the plurality of pixel areas display an image. That is, a display device of which the first pixel area PX1, which is a defective pixel area, is repaired to be a dark spot by the burned protrusion-depression surface IS may be provided.

The display device according to the exemplary embodiment is exemplarily described as an LCD, but any display device of which one or more layers among two layers forming an interface by being in contact with each other includes an organic material is applicable. In an exemplary embodiment, OLED, PDs, FEDs, EPDs, and EWDs are applicable, for example.

Hereinafter, a display device according to another exemplary embodiment will be described with reference to FIG. 6 to FIG. 8.

Figure 6:
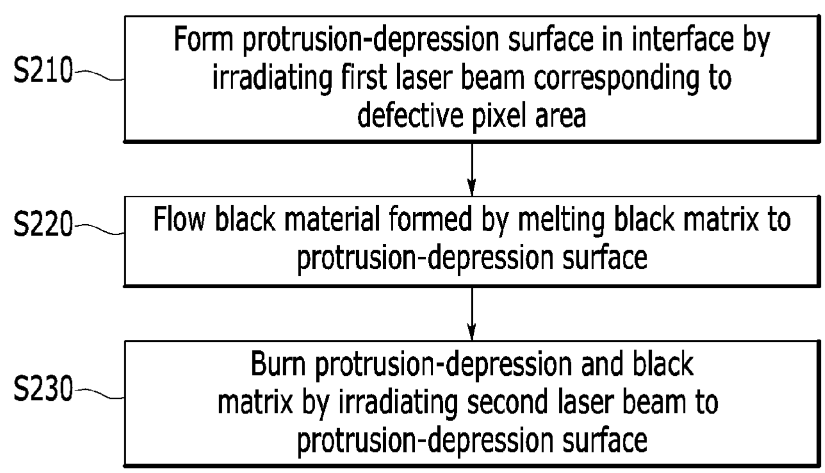
FIG. 6 illustrates a flowchart of the other exemplary embodiment of a repair method of the display device according to the invention.

FIG. 6 is a flowchart illustrating a repairing method of a display device according to another exemplary embodiment. FIGS. 7 and 8 illustrate cross-sectional views provided for description of the repairing method of the display device according to the other exemplary embodiment.

Figure 7:
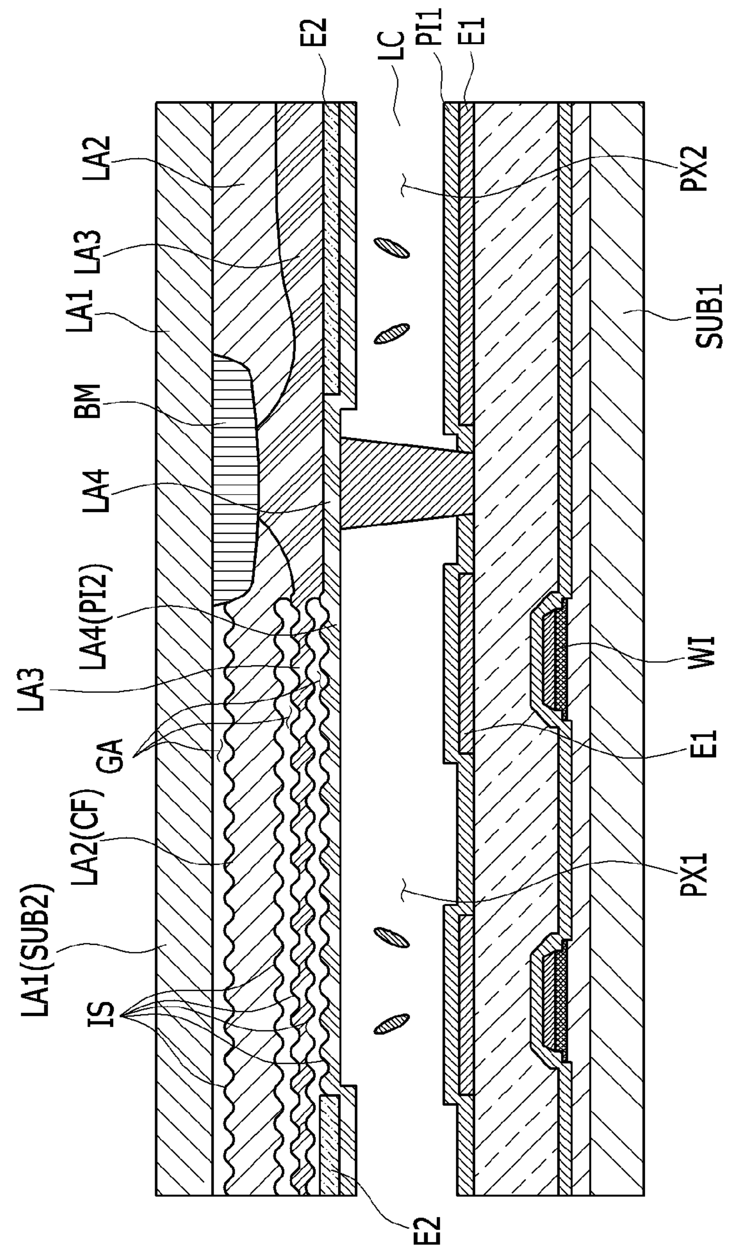
FIGS. 7 and 8 illustrate cross-sectional views of the other exemplary embodiment of the repair method of the display device according to the invention.

First, as shown in FIGS. 6 and 7, a first laser beam is irradiated to an interface corresponding to a defective pixel area to form a protrusion-depression surface (S210).

Specifically, as shown in FIG. 7, the display device includes a plurality of pixel areas, each being the minimum unit for displaying an image, and the plurality of pixel areas include a first pixel area PX1 and a second pixel area PX2. The display device includes a first substrate SUB1, a wire WI, a first electrode E1, a first alignment layer PI1, a liquid crystal layer LC, a fourth layer LA4 which is a second alignment layer PI2, a third layer LA3 which is an insulation layer, a second layer LA2 which is a color filter CF, a black matrix BM, and a first layer LA1 which is a second substrate SUB2.

The first substrate SUB1, the wire WI, the first electrode E1, the first alignment layer PI1, the liquid crystal layer LC, the fourth layer LA4 which is the second alignment layer PI2, the second electrode E2, the third layer LA3 which is the insulation layer, the second layer LA2 which is the color filter CF, the black matrix BM, and the first layer LA which is the second substrate SUB2, may have various structures known to a person skilled in the art, and thus the structure shown in FIG. 7 is not restrictive.

In order to determine whether the plurality of pixel areas included in the display device are defective, a lighting test is performed, and when it is determined that the first pixel area PX1 among the first and second pixel areas PX1 and PX2 of the plurality of pixel areas is a defective pixel area, a first laser beam is irradiated to a first interface between the first layer LA1, which is the second substrate SUB2, and the second layer LA2, which is the color filter CF, being in contact each other corresponding to the defective first pixel area PX1. The first laser beam may scan the entire area of the first pixel area PX1 with various routes in a plane.

The first laser beam may be irradiated to one or more interfaces among the first interface between the first layer LA1 and the second layer LA2 contacting each other, a second interface between the second layer LA2 and the third layer LA3 contacting each other, and a third interface between the third layer LA3 and the fourth layer LA4 contacting each other, and a surface of one or more layers including an organic material among the first, second, third, and fourth layers LA1, LA2, LA3, and LA4 is provided as a protrusion-depression surface IS. That is, one or more surfaces among the first layer LA1 and the second layer LA2 contacting each other and thus forming the first interface is provided as a protrusion-depression surface IS by the first laser beam, one or more surfaces among the second layer LA2 and the third layer LA3 contacting each other and thus forming the second interface is provided as a protrusion-depression surface IS by the first laser beam, and one or more surfaces among the third layer LA3 and the fourth layer LA4 contacting each other and thus forming the third interface is provided as a protrusion-depression surface IS by the first laser beam.

In an exemplary embodiment, when the first laser beam is irradiated to the second interface, the first laser beam passes the first interface and at the same time energy of the first laser beam is transmitted to the third interface that neighbors the second interface so that a surface of one or more layers including an organic material among the first, second, third, and fourth layers LA1, LA2, LA3, and LA4 is provided as a protrusion-depression surface IS, for example.

In another exemplary embodiment, the first layer LA1 is provided as a second substrate SUB2 that may include an inorganic material, a metal, and glass, the second layer LA2 is provided as a color filter CF including an organic material, the third layer LA3 is provided as an insulation layer including an organic material, and the fourth layer LA4 is provided as a second alignment layer PI2 including an organic material so that a surface of each of the second, third, and fourth layers LA2, LA3, and LA4 is provided as a protrusion-depression surface IS by the first laser beam. The protrusion-depression surfaces ISs provided in the first interface, the second interface, and the third interface respectively define gaps GA. Specifically, lateral surfaces of the second layer LA2, respectively forming the first interface and the second interface are provided as the protrusion-depression surfaces ISs, lateral surfaces of the third layer LA3, respectively forming the second interface and the third interface are provided as the protrusion-depression surfaces IS, and one surface of the fourth layer LA4, forming the third interface is provided as the protrusion-depression surface IS.

Figure 8:
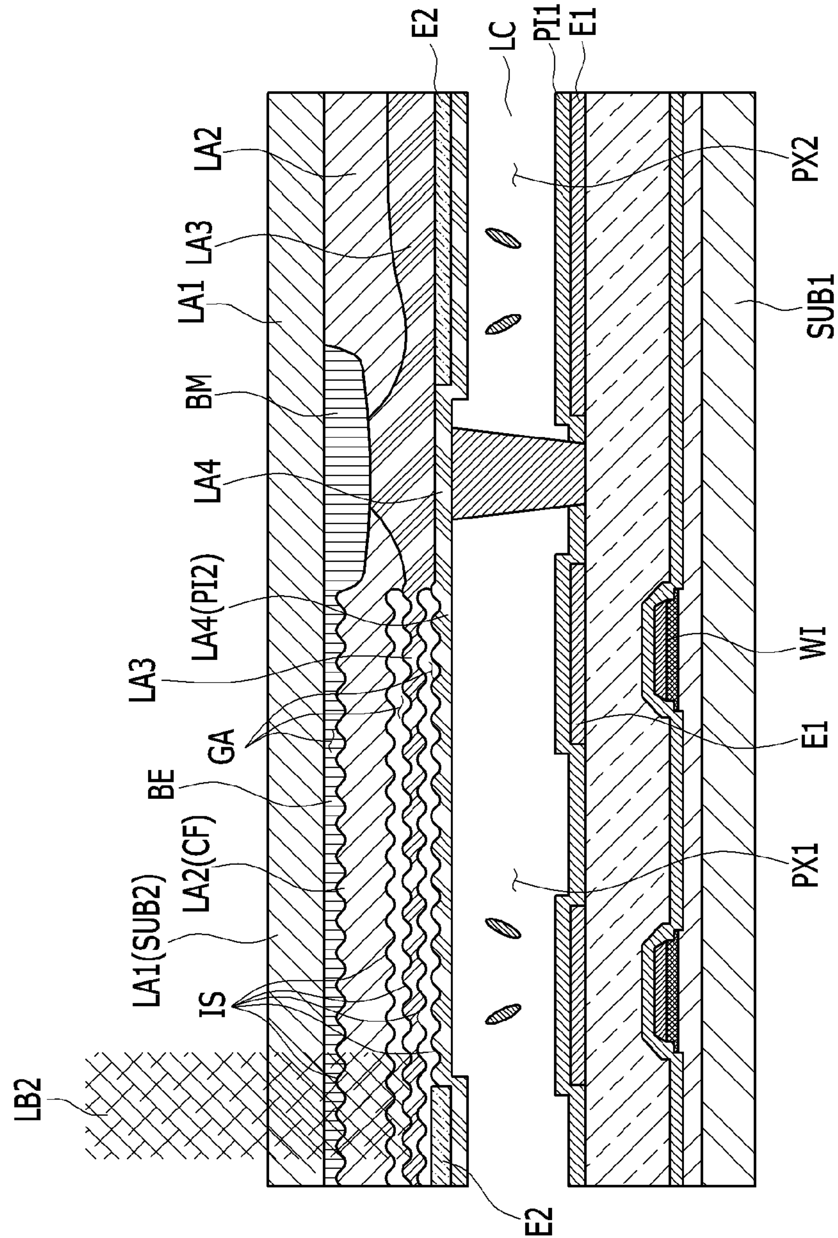

Next, as shown in FIG. 8, a black material formed by melting the black matrix flows to the protrusion-depression surface (S220).

In an exemplary embodiment, the black matrix BM that neighbors the first interface is melted by using ultraviolet ("UV") rays, a laser beam, or heat, and a black material BE provided by melting the black matrix BM flows through the gap GA defined between the first layer LA1 and the second layer LA2 along the protrusion-depression surface IS of the second layer LA2. Thus, the surface of the protrusion-depression surface IS of the second layer LA2 is covered by the black material BE, and the gap GA defined between the first layer LA1 and the second layer LA2 is filled with the black material BE.

In another exemplary embodiment, when the black material BM neighbors the second interface disposed between the second layer LA2 and the third layer LA3, a black material BE provided by melting the black material BM that neighbors the second interface may flow to each protrusion-depression surface IS of the second layer LA2 and the third layer LA3 that face opposite to each other.

Next, a second laser beam is irradiated to the protrusion-depression surfaces to burn the protrusions and depression surfaces and the black matrix (S230).

Specifically, the second laser beam LB2 is irradiated to the protrusion-depression surface IS provided in one or more surfaces among the first layer LA1 and the second layer LA2 corresponding to the first pixel area PX1, which is a defective pixel area, to burn the protrusion-depression surface IS and the black material BE in the protrusion-depression surface IS. The protrusion-depression surface IS and the black material BE2 may be carbonized while being burned by the second laser beam LB2, and accordingly the first pixel area PX1, which is a defective pixel area, may be viewed as a dark spot.

In another exemplary embodiment, when the black material is located neighboring the second interface where the second layer LA2 and the third layer LA3 contact each other, the black material provided by melting the black material in the protrusion-depression surfaces ISs of the second and third layers LA2 and LA3 that face opposite to each other may be burned.

The second laser beam LB2 may scan the entire area of the first pixel area PX1 with various routes in a plane.

The second laser beam LB2 may be irradiated to one or more protrusion-depression surfaces ISs among the first, second, third, and fourth layers LA1, LA2, LA3, and LA4, and the protrusion-depression surface IS and the black material BE in the protrusion-depression surface IS provided in one or more layers among the second layer LA2, the third layer LA3, and the fourth layer LA4, including an organic material may be carbonized while being burned by the energy of the second laser beam LB2. That is, the protrusion-depression surface IS provided in one or more surfaces of the first and second layers LA1 and LA2 is burned by the second laser beam LB2, the protrusion-depression surface IS provided in one or more surfaces of the second and third layer LA2 and LA3 is burned by the second laser beam LB2, and the black materials BE in the protrusion-depression surfaces ISs are burned such that the respective protrusion-depression surface ISs and the black materials BE may be carbonized.

In an exemplary embodiment, when the second laser beam LB2 is irradiated to the protrusion-depression surface IS of the third layer LA3, the second laser beam LB2 passes one or more protrusion-depression surfaces IS of the first and second layers LA1 and LA2 and at the same time energy of the second laser beam LB2 is transmitted to the protrusion-depression surface IS of the fourth layer LA4 that neighbors the third layer LA3 so that one or more protrusions and depression surfaces ISs, including the organic material among the first, second, third, and fourth layers LA1, LA2, LA3, and LA4 and the black material BE in the protrusion-depression surface IS of the second layer LA2 may be burned and thus carbonized, for example. Since the protrusion-depression surface IS has a larger surface area compared to those of other flat surfaces in the same predetermined space, the protrusion-depression surface IS may be easily burned and thus carbonized by energy of the second laser beam LB2. In addition, the black material BE has high energy absorption capability, and thus the black material BE may be easily burned and thus carbonized by energy of the second laser beam LB2.

In another exemplary embodiment, the protrusion-depression surface IS may be provided in each of the second, third, and fourth layers LA2, LA3, and LA4, and the black material BE is provided in the second layer LA2 so that the protrusion-depression surfaces ISs of the first, second, third, and fourth layers LA1, LA2, LA3, and LA4 and the black material BE may be respectively burned and thus carbonized by the second laser beam LB2. Specifically, the protrusion-depression surfaces ISs provided in lateral surfaces of the second layer LA2, the protrusion-depression surface IS provided in one surface of the fourth layer LA4, and the black material provided in the protrusion-depression surfaces ISs of the second layer LA2 may be burned and thus carbonized by the second laser beam LB2.

As described, the surface of each of the first, second, third, and fourth layers LA1, LA2, LA3, and LA4 that correspond to the first pixel area PX1, which is a defective pixel area where a failure has occurred among the first pixel area PX1 and the second pixel area PX2 of the display device, is provided as a protrusions and depression surface IS, and at the same time the black material is located on the protrusion-depression surface IS of the second layer LA2, and the protrusion-depression surface IS and the black material BE are burned to be carbonized such that the first pixel area PX1, which is a defective pixel area, is treated as a dark spot to thereby suppress the first pixel area PX1 from being viewed by using the repair method of the display device according to the illustrated exemplary embodiment. That is, laser beams are irradiated two times to easily repair a defective pixel area according to the repair method of the display device.

Hereinafter, a display device according to another exemplary embodiment will be described with reference to FIG. 9.

A display device according to another exemplary embodiment, which will be described hereinafter, may be a display device repaired by using the repair method of the display device according to another exemplary embodiment.

Figure 9:
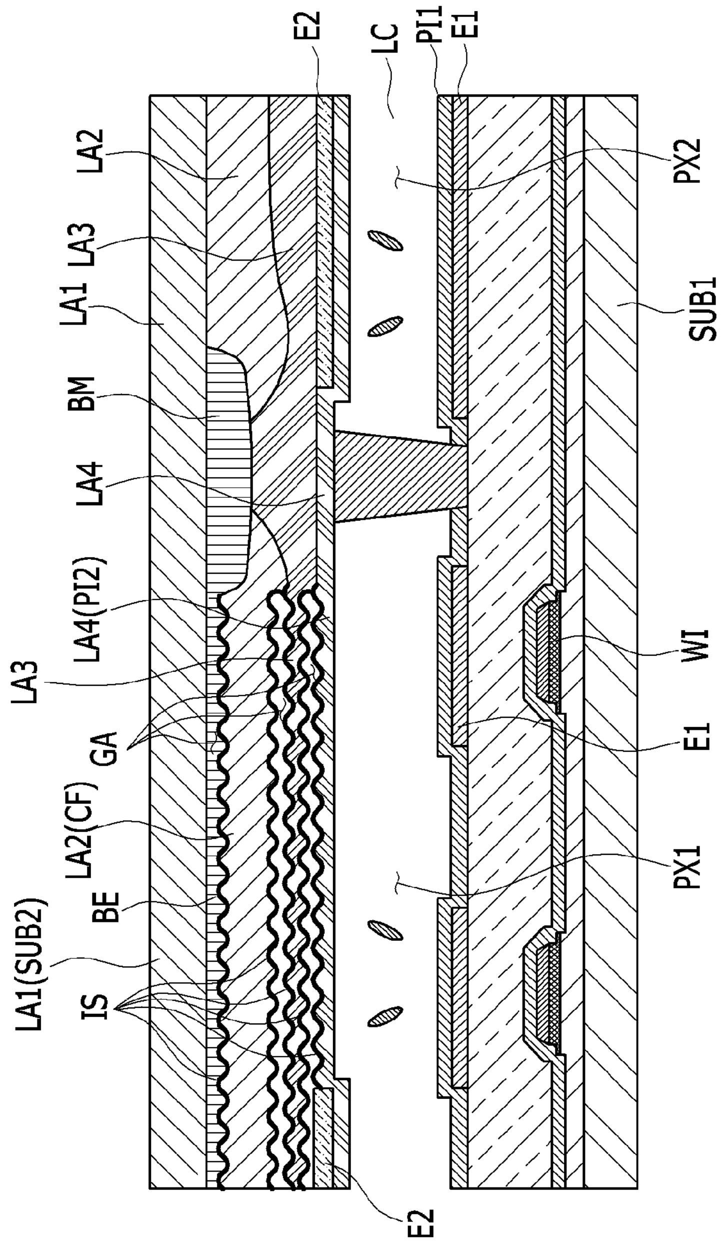
FIG. 9 illustrates a cross-sectional view of another exemplary embodiment of a display device according to the invention.

FIG. 9 illustrates a cross-sectional view of a display device according to another exemplary embodiment.

As shown in FIG. 9, a display device according to another exemplary embodiment includes a plurality of pixel areas, each being the minimum unit for displaying an image, and the plurality of pixel areas include a first pixel area PX1, which is a defective pixel area where a failure has occurred, and a second pixel area PX2, which is a normal pixel area where no failure has occurred. The display device includes a first substrate SUB1, a wire WI, a first electrode E1, a first alignment layer PI1, a liquid crystal layer LC, a fourth layer LA4, which is a second alignment layer PI2, a second electrode E2, a third layer LA3 which is an insulation layer, a second layer LA2 which is a color filter CF, a black matrix BM, and a first layer LA1 which is a second substrate SUB2, and the layers are sequentially layered.

The first substrate SUB1, the wire WI, the first electrode E1, the first alignment layer PI1, the liquid crystal layer LC, the fourth layer LA4 which is the second alignment layer PI2, the second electrode E2, the third layer LA3 which is the insulation layer, the second layer LA2 which is the color filter CF, the black matrix BM, and the first layer LA1 which is the second substrate SUB2 may have various structures known to a person skilled in the art, and thus the structure shown in FIG. 9 is not restrictive.

In the display device according to the exemplary embodiment, one or more surfaces of the first layer LA1 and the second layer LA2 contacting each other and thus forming a first interface corresponding to the first pixel area PX1 are provided as a burned protrusion-depression surface IS, one or more surfaces of the second layer LA2 and the third layer LA3 contacting each other and thus forming a second interface corresponding to the first pixel area PX1 are provided as a burned protrusion-depression surface IS, one or more surfaces of the second layer LA2 and the third layer LA3 contacting each other and thus forming a third interface corresponding to the first pixel area PX1 are provided as a burned protrusion-depression surface IS, and one or more surfaces of the third layer LA3 and the fourth layer LA4 contacting each other and thus forming a fourth interface corresponding to the first pixel area PX1 are provided as a burned protrusion-depression surface IS. Further, the display device includes a burned black material BE extended from the black matrix BM located neighboring the first interface to the protrusion-depression surface IS of the second layer LA2. That is, at least a part of the black matrix BM extended to the protrusion-depression surface IS may be burned and thus carbonized.

In the display device according to the illustrated exemplary embodiment, the first layer LA1 is provided as the second substrate SUB2 that may include an inorganic material, a metal, and glass, the second layer LA2 is provided as the color filter including an organic material, the third layer LA3 is provided as the insulation layer including an organic material, and the fourth layer LA4 is provided as the second alignment layer PI2 including an organic material such that the surface of each of the second, third, and fourth layers LA2, LA3, and LA4 is provided as a burned protrusion-depression surface IS. Gaps GA are defined respectively between the first layer LA1 and the second layer LA2, between the second layer LA2 and the third layer LA3, and between the third layer LA3 and the fourth layer LA4. Here, the gap GA defined between the first layer LA1 and the second layer LA2 is filled with the black material BE provided from the black material BM. Specifically, lateral surfaces of the second layer LA2 respectively forming the first interface and the second interface are provided as burned protrusion-depression surfaces ISs, lateral surfaces of the third layer LA3 respectively forming the second interface and the third interface are provided as burned protrusion-depression surfaces ISs, one surface of the fourth layer LA4 forming the third interface is provided as a burned protrusion-depression surface IS, and the gap GA between the first layer LA1 and the second layer LA2 is filled with the burned black material BE. That is, the burned protrusion-depression surfaces IS and the burned black matrix BE corresponding to the first pixel area PX1 are viewed dark, and accordingly, the first pixel area PX1 is viewed as a dark spot.

As described, in the display device according to the illustrated exemplary embodiment, the surfaces of the second, third, and fourth layers LA2, LA3, and LA4 among the first, second, third, and fourth layers LA1, LA2, LA3, and LA4 that correspond to the first pixel area PX1, which is a defective pixel area, among the first pixel area PX1 and the second pixel area PX2 are provided as the burned protrusion-depression surfaces ISs and at the same time the burned black material BE is provided corresponding to the first pixel area PX1 so that the defective first pixel area PX1 is viewed as a dark spot, and accordingly the first pixel area PX1 is prevented from being viewed when other pixels areas among the plurality of pixel areas display an image. That is, the display device according to the illustrated exemplary embodiment repairs the first pixel area PX1, which is a defective pixel area, to be a dark spot by the burned protrusion-depression surfaces ISs and the burned black material BE.

Hereinafter, a display device according to another exemplary embodiment will be described with reference to FIG. 10. A display device according to another exemplary embodiment, which will be described hereinafter, may be a display device repaired by using the repair method of the display device according to another exemplary embodiment.

Figure 10:
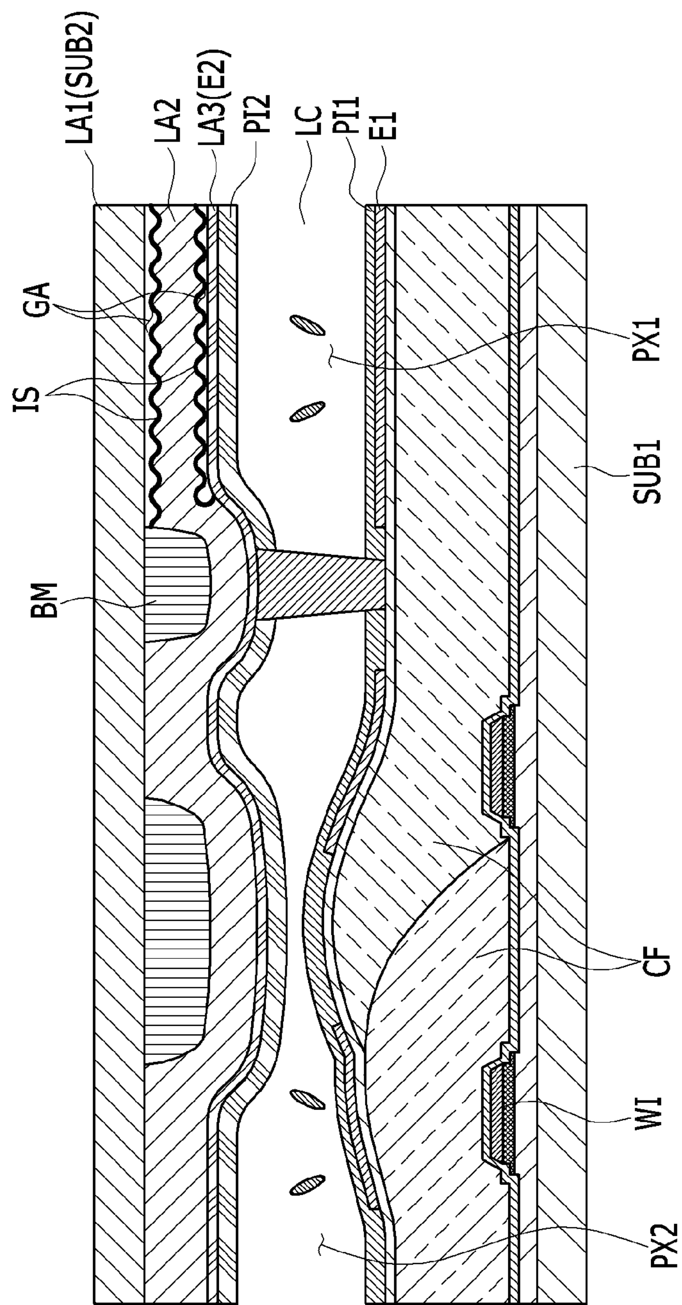
FIG. 10 illustrates a cross-sectional view of another exemplary embodiment of a display device according to the invention.

FIG. 10 illustrates a cross-sectional view of a display device according to another exemplary embodiment.

As shown in FIG. 10, a display device according to another exemplary embodiment includes a plurality of pixel areas, each being the minimum unit for displaying an image, and the plurality of pixel areas include a first pixel area PX1 which is a defective pixel area where a failure has occurred, and a second pixel area PX2 which is a normal pixel area where no failure has occurred. The display device includes a first substrate SUB1, a wire WI, a color filter CF, a first electrode E1, a first alignment layer PI1, a liquid crystal layer LC, a second alignment layer PI2, a third layer LA3 which is a second electrode E2, a second layer LA2 which is an insulation layer, a black matrix BM, and a first layer LA1 which is a second substrate SUB2, and the layers are sequentially layered.

The display device includes the first substrate SUB1, the wire WI, the color filter CF, the first electrode E1, the first alignment layer PI1, the liquid crystal layer LC, the second alignment layer PI2, the third layer LA3 which is the second electrode E2, the second layer LA2 which is the insulation layer, the black matrix BM, and the first layer LA1 which is the second substrate SUB2 may respectively have various structures known to a person skilled in the art, and thus the structure shown in FIG. 10 is not restrictive.

In the display device according to the illustrated exemplary embodiment, one or more surfaces of the first layer LA1 and the second layer LA2 contacting each other and thus forming a first interface corresponding to the first pixel area PX1 are provided as a burned protrusion-depression surface IS, and one or more surfaces of the second layer LA2 and the third layer LA3 contacting each other and thus forming a second interface corresponding to the first pixel area PX1 are provided as a burned protrusion-depression surface IS.

In the display device according to the illustrated exemplary embodiment, the first layer LA1 is provided as the second substrate SUB2 that may include an inorganic material, a metal, and glass, the second layer LA2 is provided as the insulation layer that includes an organic material, and the third layer LA3 is provided as a transparent conductive oxide including indium tin oxide ("ITO") or indium zinc oxide ("IZO") such that lateral surfaces of the second layer LA2 are provided as burned protrusion-depression surfaces ISs. Due to the protrusion-depression surfaces ISs, gaps Gas are respectively defined between the first layer LA1 and the second layer LA2 and between the second layer LA2 and the third layer LA3. Specifically, lateral surfaces of the second layer LA2, respectively forming the first interface and the second interface are provided as the burned protrusion-depression surfaces ISs. That is, the protrusion-depression surfaces ISs burned corresponding to the first pixel area PX1 are viewed dark, and thus the first pixel area PX1 is viewed as a dark spot.

As described, in the display device according to the illustrated exemplary embodiment, the lateral surfaces of the second layer LA2 among the first, second, and third layers LA1, LA2, and LA3 corresponding to the first pixel area PX1 which is a defective pixel area among the first pixel area PX1 and the second pixel area PX2 are provided as the burned protrusion-depression surfaces ISs and thus the defective first pixel area PX1 is viewed as a dark spot, and accordingly, the first pixel area PX1 may be prevented from being viewed when other pixel areas of the plurality of pixel areas display an image. That is, a display device in which a first pixel area PX1, which is a defective pixel area, is repaired to be a dark spot by burned protrusion-depression surfaces ISs may be provided.

Hereinafter, a display device according to another exemplary embodiment will be described with reference to FIG. 11. A display device according to another exemplary embodiment, which will be described hereinafter, may be a display device repaired by using the repair method of the display device according to another exemplary embodiment.

Figure 11:
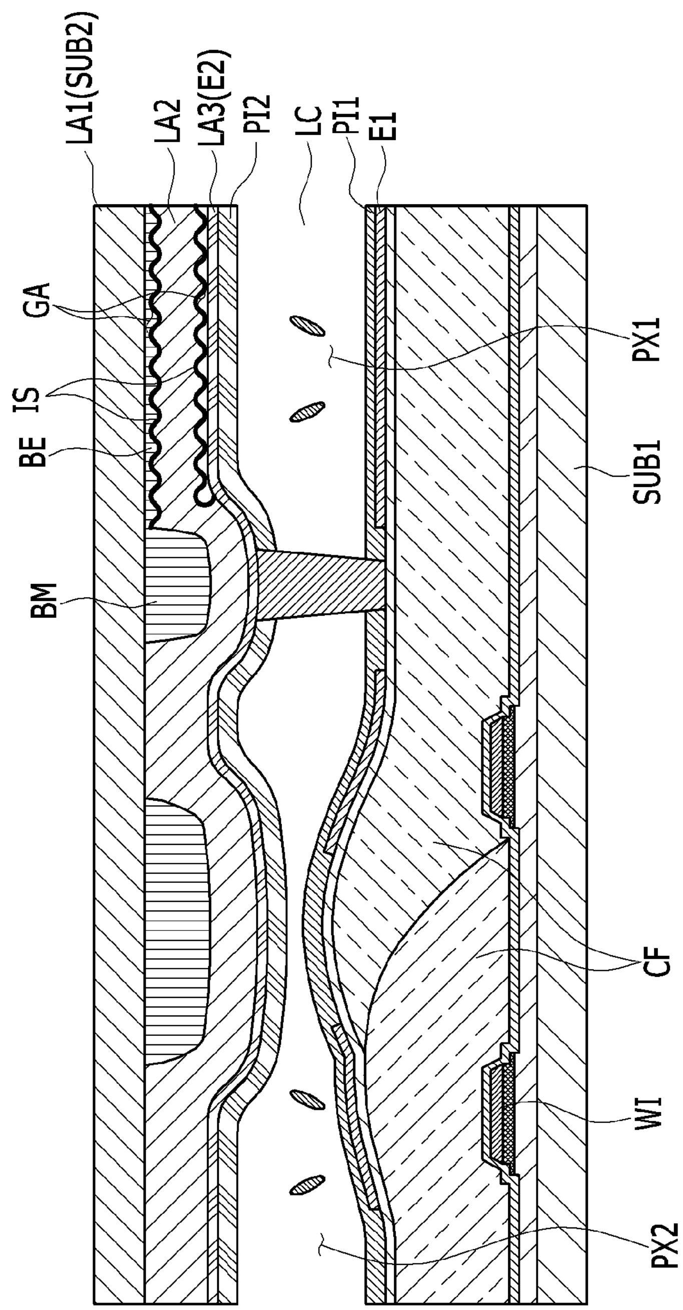
FIG. 11 illustrates a cross-sectional view of another exemplary embodiment of a display device according to the invention.

FIG. 11 illustrates a cross-sectional view of a display device according to another exemplary embodiment.

As shown in FIG. 11, a display device according to another exemplary embodiment includes a plurality of pixel areas, each being the minimum unit for displaying an image, and the plurality of pixel areas include a first pixel area PX1, which is a defective pixel area where a failure has occurred, and a second pixel area PX2, which is a normal pixel area where no failure has occurred. The display device includes a first substrate SUB1, a wire WI, a color filter CF, a first electrode E1, a first alignment layer PI1, a liquid crystal layer LC, a second alignment layer PI2, a third layer L3 which is a second electrode E2, a second layer LA2 which is an insulation layer, a black matrix BM, and a first layer LA1 which is a second substrate SUB2, and the layers are sequentially layered.

The first substrate SUB1, the wire WI, the color filter CF, the first electrode E1, the first alignment layer PI1, the liquid crystal layer LC, the second alignment layer PI2, the third layer LA3 which is the second electrode E2, the second layer LA2 which is the insulation layer, the black matrix BM, and the first layer LA1 which is the second substrate SUB2 may respectively have various structures, and thus the structure shown in FIG. 11 is not restrictive.

In the display device according to the illustrated exemplary embodiment, one or more surfaces of the first layer LA1 and the second layer LA2 contacting each other and thus forming a first interface corresponding to the first pixel area PX1 are provided as a burned protrusion-depression surface IS, and one or more surfaces of the second layer LA2 and the third layer LA3 contacting each other and thus forming a third interface corresponding to the first pixel area PX1 are provided as a burned protrusion-depression surface IS. Further, the display device includes a burned black material BE extended from the black matrix BM disposed neighboring the first interface to the protrusion-depression surfaces ISs of the second layer LA2. That is, at least a part of the black matrix BM extended to the protrusion-depression surface IS may be burned and thus carbonized.

In the display device according to the illustrated exemplary embodiment, the first layer LA1 is provided as the second substrate SUB2 that may include an inorganic material, a metal, and glass, the second layer LA2 is provided as the insulation layer including an organic material, and the third layer LA3 is provided as a transparent conductive oxide including ITO or IZO so that lateral surfaces of the second layer LA2 are provided as burned protrusion-depression surfaces ISs. Due to the protrusion-depression surfaces ISs, gaps Gas are respectively defined between the first layer LA1 and the second layer LA2 and between the second layer LA2 and the third layer LA3. Here, the black material BE provided from the black matrix BM fills the gap GA defined between the first layer LA1 and the second layer LA2. Specifically, the lateral surfaces of the second layers LA2 respectively forming the first interface and the second interface are provided as the burned protrusion-depression surfaces ISs, and the gap GA between the first layer LA1 and the second layer LA2 is filled with the burned black material BE. That is, the burned protrusion-depression surface IS corresponding to the first pixel area PX1 and the burned black material BE are viewed dark, and accordingly, the first pixel area PX1 is viewed as a dark spot.

As described, in the display device according to the illustrated exemplary embodiment, the lateral surfaces of the second layer LA2 among the first, second, and third layers LA1, LA2, and LA3 corresponding to the first pixel area PX1, which is a defective pixel area among the first pixel area PX1 and the second pixel area PX2, are provided as the burned protrusion-depression surfaces ISs, and simultaneously the burned black material BE is provided corresponding to the first pixel area PX1 so that the first pixel area PX1 which is the defective pixel area is viewed as a dark spot, and accordingly, the first pixel area PX1 may be prevented from being viewed when other pixel areas among the plurality of pixel areas display an image. That is, a display device in which a first pixel area PX1, which is a defective pixel area, is repaired to be a dark spot by burned protrusion-depression surfaces ISs and the burned black material BE may be provided.

Hereinafter, a display device according to another exemplary embodiment will be described with reference to FIGS. 12A and 12B. A display device according to another exemplary embodiment, which will be described hereinafter, may be a display device repaired by using the repair method of the display device according to another exemplary embodiment.

Figure 12A:
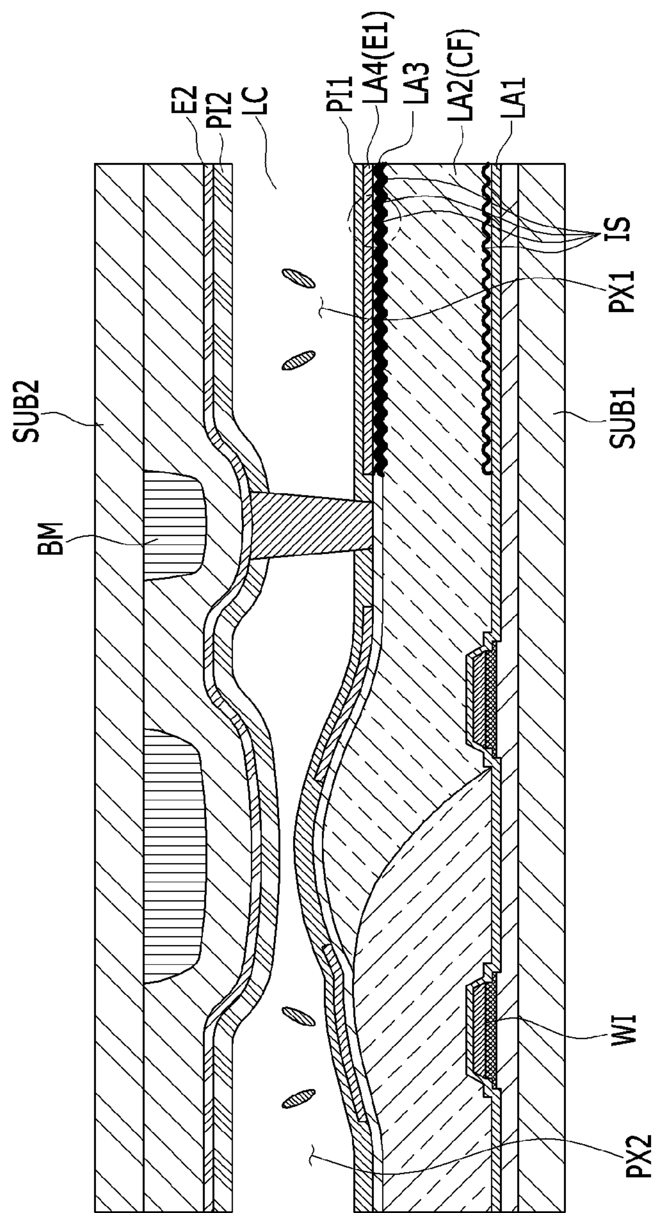
FIG. 12A illustrates a cross-sectional view of another exemplary embodiment of a display device according to the invention.
Figure 12B:
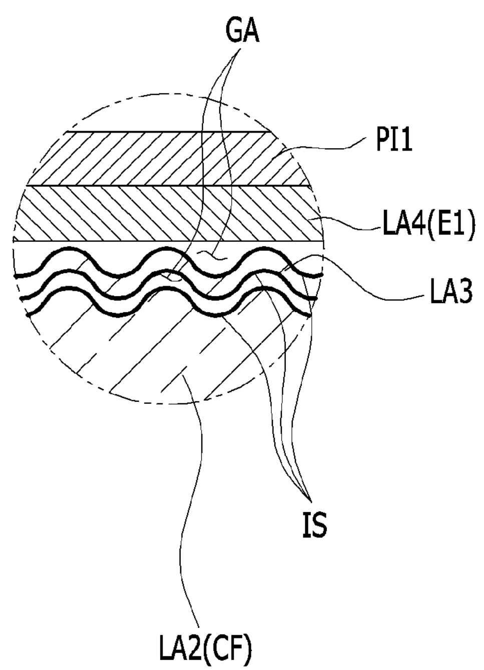
FIG. 12B illustrates a cross-sectional view of enlarged portion of the display device of FIG. 12A.

FIGS. 12A and 12B illustrate a cross-sectional view of a display device according to another exemplary embodiment and an enlarged view of a portion of the display device.

As shown in FIGS. 12A and 12B, a display device according to another exemplary embodiment includes a plurality of pixel areas, each being the minimum unit for displaying an image, and the plurality of pixel areas include a first pixel area PX1 which is a defective pixel area where a failure has occurred, and a second pixel area PX2 which is a normal pixel area where no failure has occurred. The display device includes a first layer SUB1, a wire WI, a first layer LA1 which is an insulation layer, a second layer LA2 which is a color filter CF, a third layer LA3 which is an insulation layer, a fourth layer LA4 which is a first electrode E1, a first alignment layer PI1, a liquid crystal layer LC, a second alignment layer PI2, a second electrode E2, a black matrix BM, and a second substrate SUB2, and the layers are sequentially layered.

The first substrate SUB1, the wire WI, the first layer LA1 which is the insulation layer, the second layer LA2 which is the color filter CF, the third layer LA3 which is the insulation layer, the fourth layer LA4 which is the first electrode E1, the first alignment layer PI1, the liquid crystal layer LC, the second alignment layer PI2, the second electrode E2, the black matrix BM, and the second substrate SUB2 may respectively have various structures known to a person skilled in the art, and thus the structure shown in FIGS. 12A and 12B is not restrictive.

In the display device according to the illustrated exemplary embodiment, one or more surfaces of the first layer LA1 and the second layer LA2 contacting each other and thus forming a first interface corresponding to the first pixel area PX1 are provided as a burned protrusion-depression surface IS, one or more surfaces of the second layer LA2 and the third layer LA3 contacting each other and thus forming a second interface corresponding to the first pixel area PX1 are provided as a burned protrusion-depression surface IS, one or more surfaces of the second layer LA2 and the third layer LA3 contacting each other and thus forming a third interface corresponding to the first pixel area PX1 are provided as a burned protrusion-depression surface IS, and one or more surfaces of the third layer LA3 and the fourth layer LA4 contacting each other, and thus forming a fourth interface corresponding to the first pixel area PX1 are provided as a burned protrusion-depression surface IS.

In the display device according to the illustrated exemplary embodiment, the first layer LA1 is provided as the insulation layer provided above the first substrate SUB1 and including an inorganic material, the second layer LA2 is provided as the color filter CF including an organic material, the third layer LA3 is provided as an insulation layer including an organic material, and the fourth layer LA4 is provided as the first electrode such that surfaces of the second and third layers LA2 and LA3 are respectively provided as protrusion-depression surfaces ISs. Due to the protrusion-depression surfaces ISs, gaps GAs are respectively defined between the first layer LA1 and the second layer LA2, between the second layer LA2 and the third layer LA3, and between the third layer LA3 and the fourth layer LA4. Specifically, the lateral surfaces of the second layer LA2, respectively forming the first interface and the second interface, are provided as burned protrusion-depression surfaces ISs, and the lateral surfaces of the third layer LA3, respectively forming the second interface and the third interface, are provided as burned protrusion-depression surfaces ISs. That is, the burned protrusion-depression surfaces IS are viewed dark, and accordingly, the first pixel area PX1 is viewed as a dark spot.

As described, in the display device according to the exemplary embodiment, the lateral surfaces of the second and third layers LA2 and LA3 among the first, second, third, and fourth layers LA1, LA2, LA3, and LA4 that correspond to the first pixel area PX1 which is a defective pixel area, among the first pixel area PX1 and the second pixel area PX2, are provided as the burned protrusion-depression surfaces ISs so that the defective first pixel area PX1 is viewed as a dark spot, and accordingly, the first pixel area PX1 is prevented from being viewed when other pixels areas among the plurality of pixel areas display an image. That is, a display device in which a first pixel area PX1, which is a defective pixel area, is repaired to be a dark spot by burned protrusion-depression surfaces ISs may be provided.

Hereinafter, a display device according to another exemplary embodiment will be descried with reference to FIG. 13. A display device according to another exemplary embodiment, which will be described hereinafter, may be a display device repaired by using the repair method of the display device according to another exemplary embodiment.

Figure 13:
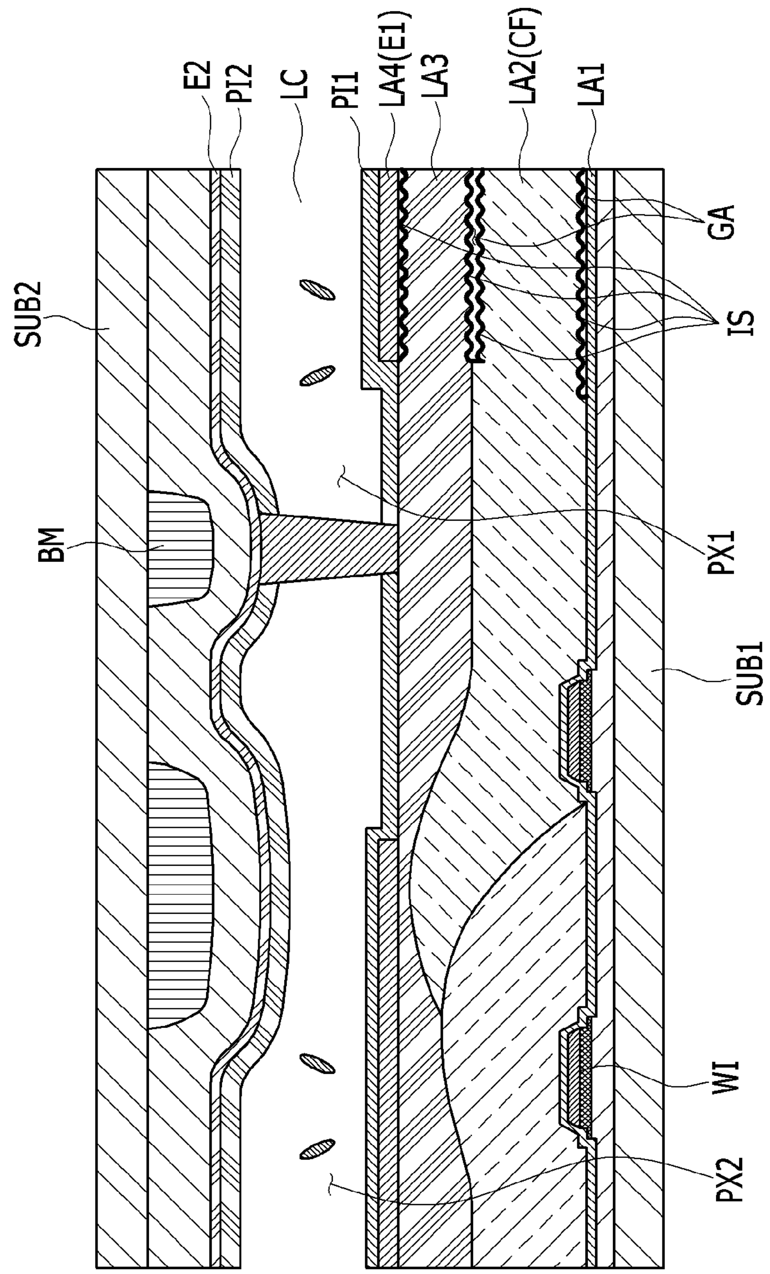
FIG. 13 illustrates a cross-sectional view of another exemplary embodiment of a display device according to the invention.

FIG. 13 illustrates a cross-sectional view of a display device according to another exemplary embodiment.

As shown in FIG. 13, a display device according to another exemplary embodiment includes a plurality of pixel areas, each being the minimum unit for displaying an image, and the plurality of pixel areas include a first pixel area PX1 which is a defective pixel area where a failure has occurred, and a second pixel area PX2 which is a normal pixel area where no failure has occurred. The display device includes a first substrate SUB1, a wire WI, a first layer LA1 which is an insulation layer, a second layer LA2 which is a color filter CF, a third layer LA3 which is a flat insulation layer, a fourth layer LA4 which is a first electrode E1, a first alignment layer PI1, a liquid crystal layer LC, a second alignment layer PI2, a second electrode E2, a black matrix BM, and a second substrate SUB2, and the layers are sequentially layered.

The first substrate SUB1, the wire WI, the first layer LA1 which is the insulation layer, the second layer LA2 which is the color filter CF, the third layer LA3 which is the insulation layer, the fourth layer LA4 which is the first electrode E1, the first alignment layer PI1, the liquid crystal layer LC, the second alignment layer PI2, the second electrode E2, the black matrix BM, and the second substrate SUB2 may respectively have various structures known to a person skilled in the art, and thus the structure shown in FIG. 13 is not restrictive.

In the display device according to the illustrated exemplary embodiment, one or more surfaces of the first layer LA1 and the second layer LA2 contacting each other and thus forming a first interface corresponding to the first pixel area PX1 are provided as a burned protrusion-depression surface IS, one or more surfaces of the second layer LA2 and the third layer LA3 contacting each other and thus forming a second interface corresponding to the first pixel area PX1 are provided as a burned protrusion-depression surface IS, one or more surfaces of the second layer LA2 and the third layer LA3 contacting each other and thus forming a third interface corresponding to the first pixel area PX1 are provided as a burned protrusion-depression surface IS, and one or more surfaces of the third layer LA3 and the fourth layer LA4 contacting each other and thus forming a fourth interface corresponding to the first pixel area PX1 are provided as a burned protrusion-depression surface IS.

In the display device according to the exemplary embodiment, the first layer LA1 is provided as the insulation layer provided above the first substrate SUB1 and including an inorganic material, the second layer LA2 is provided as the color filter CF including an organic material, the third layer LA3 is provided as an insulation layer including an organic material, and the fourth layer LA4 is provided as the first electrode such that surfaces of the second and third layers LA2 and LA3 are respectively provided as protrusion-depression surfaces ISs. Due to the protrusion-depression surfaces ISs, gaps GAs are respectively defined between the first layer LA1 and the second layer LA2, between the second layer LA2 and the third layer LA3, and between the third layer LA3 and the fourth layer LA4. Specifically, the lateral surfaces of the second layer LA2, respectively forming the first interface and the second interface, are provided as burned protrusion-depression surfaces ISs, and the lateral surfaces of the third layer LA3, respectively forming the second interface and the third interface, are provided as burned protrusion-depression surfaces ISs. That is, the burned protrusion-depression surfaces IS are viewed dark, and accordingly, the first pixel area PX1 is viewed as a dark spot.

As described, in the display device according to the illustrated exemplary embodiment, the lateral surfaces of the second and third layers LA2 and LA3 among the first, second, third, and fourth layers LA1, LA2, LA3, and LA4 that correspond to the first pixel area PX1 which is a defective pixel area, among the first pixel area PX1 and the second pixel area PX2, are provided as the burned protrusion-depression surfaces ISs so that the defective first pixel area PX1 is viewed as a dark spot, and accordingly, the first pixel area PX1 is prevented from being viewed when other pixels areas among the plurality of pixel areas display an image. That is, a display device in which a first pixel area PX1, which is a defective pixel area, is repaired to be a dark spot by burned protrusion-depression surfaces ISs may be provided.

Hereinafter, a display device according to another exemplary embodiment will be described with reference to FIG. 14. A display device according to another exemplary embodiment, which will be described hereinafter, may be a display device repaired by using the repair method of the display device according to another exemplary embodiment.

Figure 14:
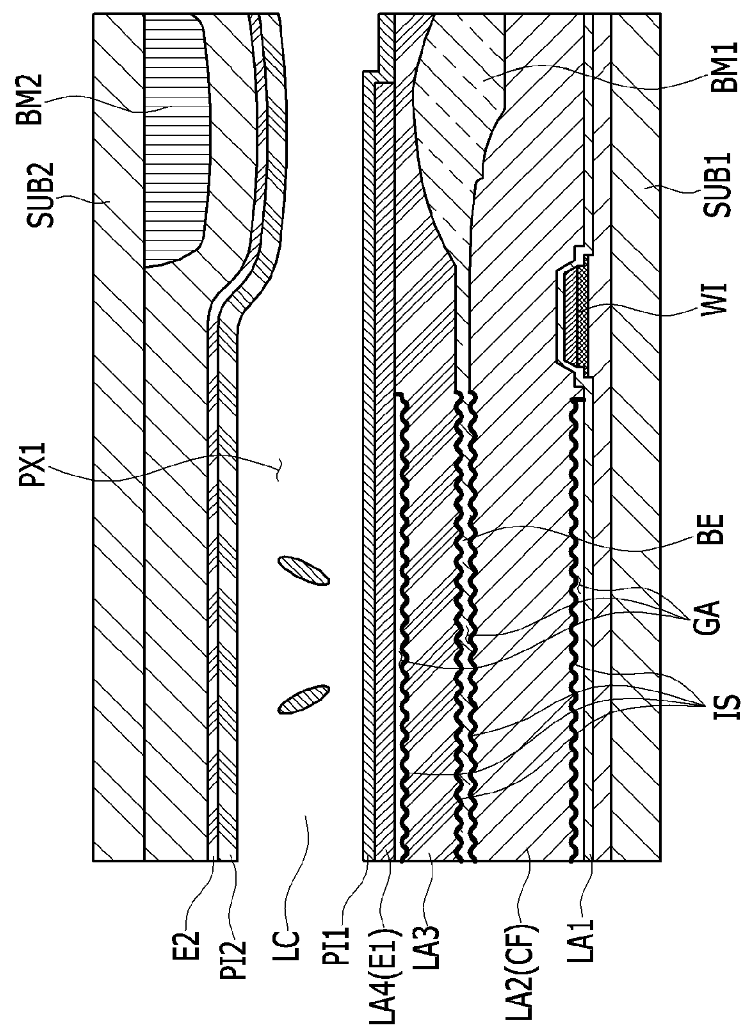
FIG. 14 illustrates a cross-sectional view of another exemplary embodiment of a display device according to the invention.

FIG. 14 illustrates a cross-sectional view of a display device according to another exemplary embodiment.

As shown in FIG. 14, a display device according to another exemplary embodiment includes a plurality of pixel areas, each being the minimum unit for displaying an image, and the plurality of pixel areas include a first pixel area PX1, which is a defective pixel area where a failure has occurred, and a second pixel area, which is a normal pixel area where no failure has occurred. The display device includes a first substrate SUB1, a wire WI, a first layer LA1 which is an insulation layer, a second layer LA2 which is a color filter CF, a first black matrix BM1, a third layer LA3 which is a flat insulation layer, a fourth layer LA4 which is a first electrode E1, a first alignment layer PI1, a liquid crystal layer LC, a second alignment layer PI2, a second electrode E2, a second black matrix BM2, and a second substrate SUB2, and the layers are sequentially layered.

The first substrate SUB1, the wire WI, the first layer LA1 which is the insulation layer, the second layer LA2 which is the color filter CF, the first black matrix BM1, the third layer LA3 which is the flat insulation layer, the fourth layer LA4 which is the first electrode E1, the first alignment layer PI1, the liquid crystal layer LC, the second alignment layer PI2, the second electrode E2, the second black matrix BM2, and the second substrate SUB2 may respectively have various structures known to a person skilled in the art, and the structure shown in FIG. 14 is not restrictive.

In the display device according to the exemplary embodiment, one or more surfaces of the first layer LA1 and the second layer LA2 contacting each other and thus forming a first interface corresponding to the first pixel area PX1 are provided as a burned protrusion-depression surface IS, one or more surfaces of the second layer LA2 and the third layer LA3 contacting each other and thus forming a second interface corresponding to the first pixel area PX1 are provided as a burned protrusion-depression surface IS, one or more surfaces of the second layer LA2 and the third layer LA3 contacting each other and thus forming a third interface corresponding to the first pixel area PX1 are provided as a burned protrusion-depression surface IS, and one or more surfaces of the third layer LA3 and the fourth layer LA4 contacting each other and thus forming a fourth interface corresponding to the first pixel area PX1 are provided as a burned protrusion-depression surface IS. Further, the display device includes a burned black material BE extended to the protrusion-depression surfaces ISs of the second layer LA2 and the third layer LA3 that are disposed facing each other from the first black matrix BM1 disposed neighboring the second interface. That is, at least a part of the black matrix BM extended from the protrusion-depression surfaces ISs may be burned and thus carbonized.

In the display device according to the exemplary embodiment, the first layer LA1 is provided as the insulation layer provided above the first substrate SUB1 and including an inorganic material, the second layer LA2 is provided as the color filter CF including an organic material, the third layer LA3 is provided as an insulation layer including an organic material, and the fourth layer LA4 is provided as the first electrode such that surfaces of the second and third layers LA2 and LA3 are respectively provided as protrusion-depression surfaces ISs. Due to the protrusion-depression surfaces ISs, gaps GAs are respectively provided between the first layer LA1 and the second layer LA2, between the second layer LA2 and the third layer LA3, and between the third layer LA3 and the fourth layer LA4. Here, the black material BE provided from the first black matrix BM1 fills the gap GA provided between the second layer LA2 and the third layer LA3. Specifically, the lateral surfaces of the second layers LA2 respectively forming the first interface and the second interface, and the lateral surfaces of the third layer LA3 respectively forming the second interface and the third interface are provided as the burned protrusion-depression surfaces ISs, and the gap GA between the second layer LA2 and the third layer LA3 is filled with the burned black material BE. That is, the burned protrusion-depression surface IS corresponding to the first pixel area PX1 and the burned black material BE are viewed dark, and accordingly, the first pixel area PX1 is viewed as a dark spot.

As described, in the display device according to the exemplary embodiment, the lateral surfaces of the second and third layers LA2 and LA3 among the first, second, third, and fourth layers LA1, LA2, LA3, and LA4 that correspond to the first pixel area PX1, which is a defective pixel area, among the first pixel area PX1 and the second pixel area PX2, are provided as the burned protrusion-depression surfaces ISs, and at the same time the burned black material BE is provided corresponding to the first pixel area PX1 so that the defective first pixel area PX1 is viewed as a dark spot, and accordingly, the first pixel area PX1 is prevented from being viewed when other pixels areas among the plurality of pixel areas display an image. That is, a display device in which a first pixel area PX1, which is a defective pixel area, is repaired to be a dark spot by burned protrusion-depression surfaces ISs and the burned black material BE may be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device including a first pixel area where a failure has occurred and a second pixel area neighboring the first pixel area, comprising a first layer and a second layer contacting each other and thus forming a first interface, and a third layer contacting the second layer and thus forming a second interface, wherein a burned protrusion-depression surface is disposed in one or more surfaces of the first layer and the second layer forming the first interface corresponding to the first pixel area, and a burned protrusion-depression surface is disposed in one or more surfaces of the second layer and the third layer forming the second interface corresponding to the first pixel area.

2. The display device of claim 1, wherein the first layer is a substrate and the second layer comprises an organic material.

3. The display device of claim 2, wherein the second layer is a color filter.

4. The display device of claim 2, wherein the protrusion-depression surface is disposed in the second layer.

5. The display device of claim 1, wherein the first layer comprises an inorganic material, and the second layer comprises an organic material.

6. The display device of claim 5, wherein the protrusion-depression surface is disposed in the second layer.

7. The display device of claim 1, further comprising a black matrix provided neighboring the first interface and extended to the protrusion-depression surface, wherein at least a part of the black matrix extended to the protrusion-depression surface is burned.

8. The display device of claim 1, wherein the second layer and the third layer respectively comprise an organic material.

9. The display device of claim 8, wherein the second layer is a color filter.

10. The display device of claim 8, wherein the protrusion-depression surface is disposed in each of the second and third layers.

11. The display device of claim 1, wherein the second layer comprises an organic material, and the third layer comprises a transparent conductive oxide.

12. The display device of claim 11, wherein the protrusion-depression surface is disposed in the second layer.

13. The display device of claim 1, further comprising a black matrix provided neighboring the second interface and extended to the protrusion-depression surface, wherein at least a part of the black matrix extended to the protrusion-depression surface is burned.

14. The display device of claim 1, further comprising a fourth layer contacting the third layer and thus forming a third interface, wherein a burned protrusion-depression surface is disposed in one or more surfaces of the third and fourth layers forming the third interface corresponding to the first pixel area.

* * * * *